April 1, 1930.  H. B. LAYTON  1,752,440
APPARATUS FOR SEASONING SKINS
Filed July 28, 1927  8 Sheets-Sheet 1

Inventor
Harry B. Layton,
by Francis T. Chambers
his Attorney.

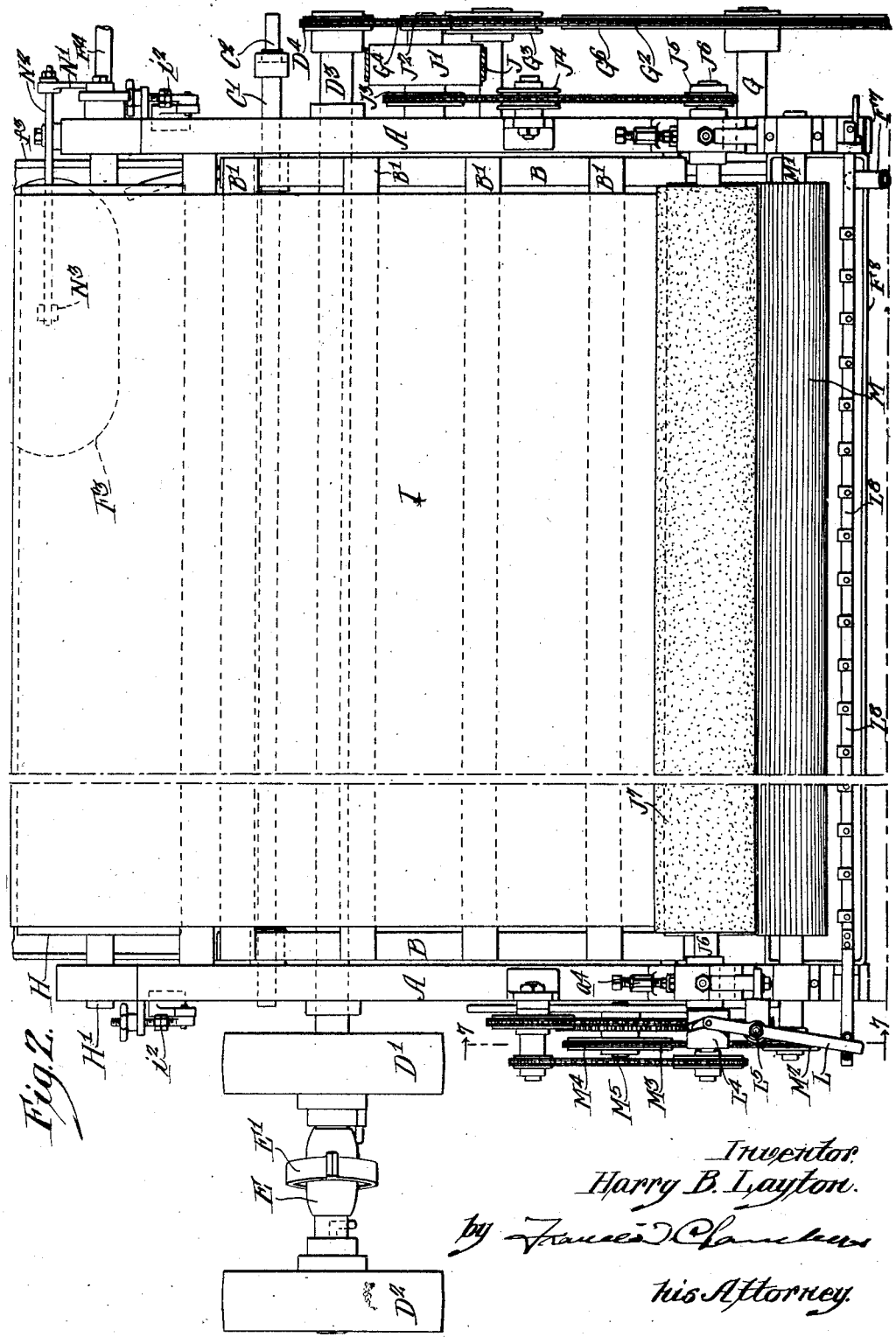

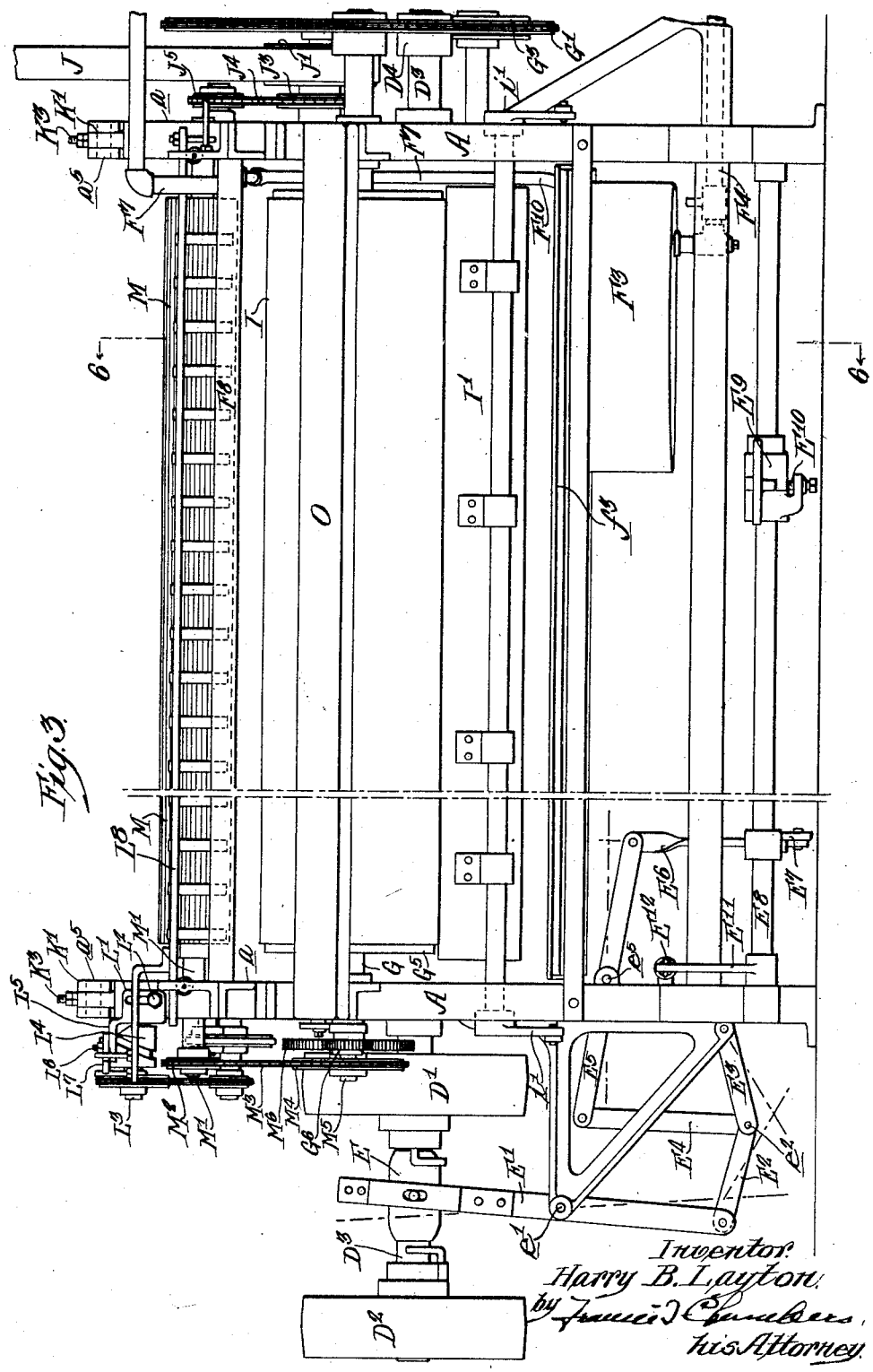

April 1, 1930. H. B. LAYTON 1,752,440
APPARATUS FOR SEASONING SKINS
Filed July 28, 1927 8 Sheets-Sheet 4
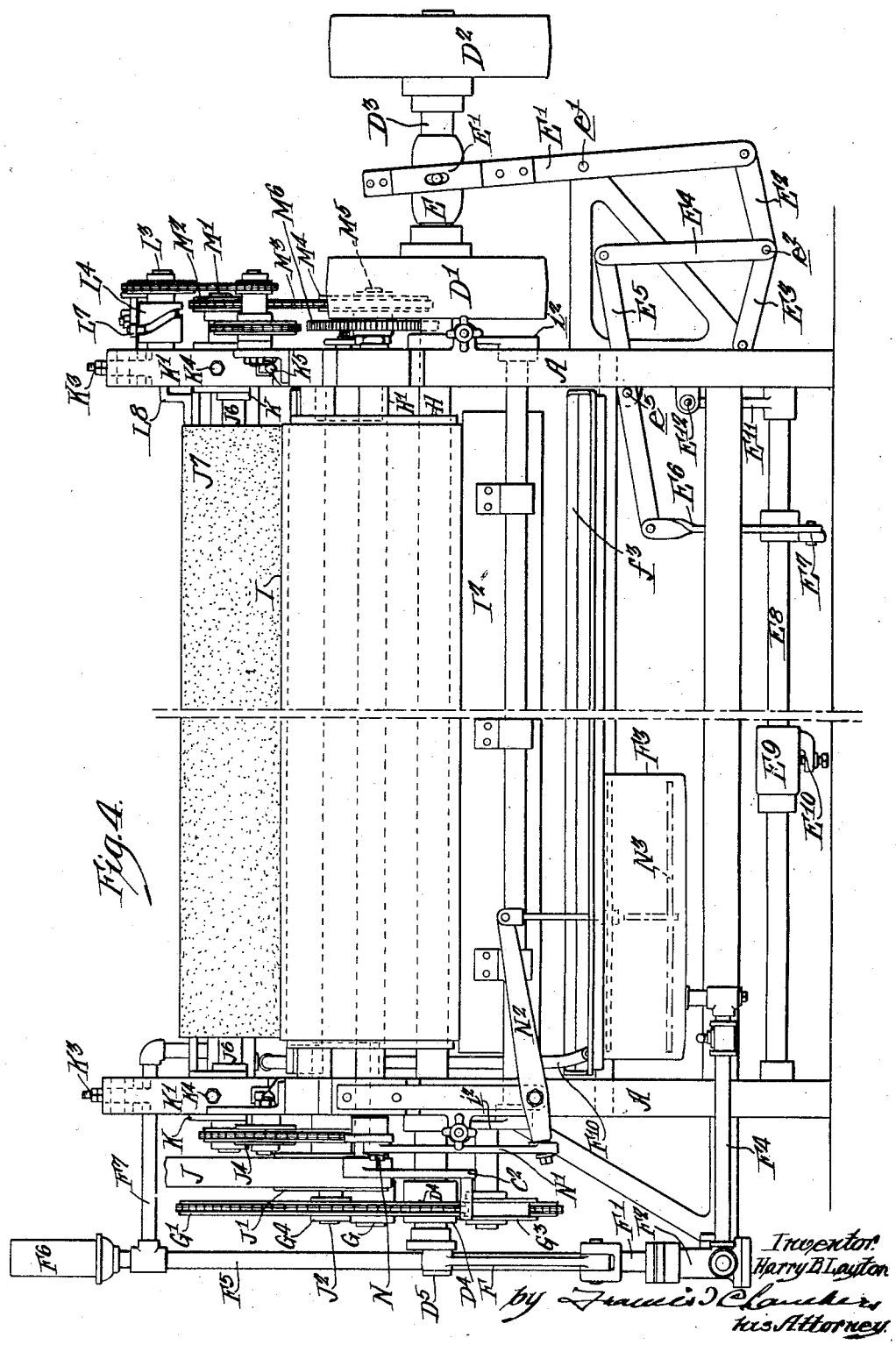

April 1, 1930.  H. B. LAYTON  1,752,440
APPARATUS FOR SEASONING SKINS
Filed July 28, 1927   8 Sheets-Sheet 5
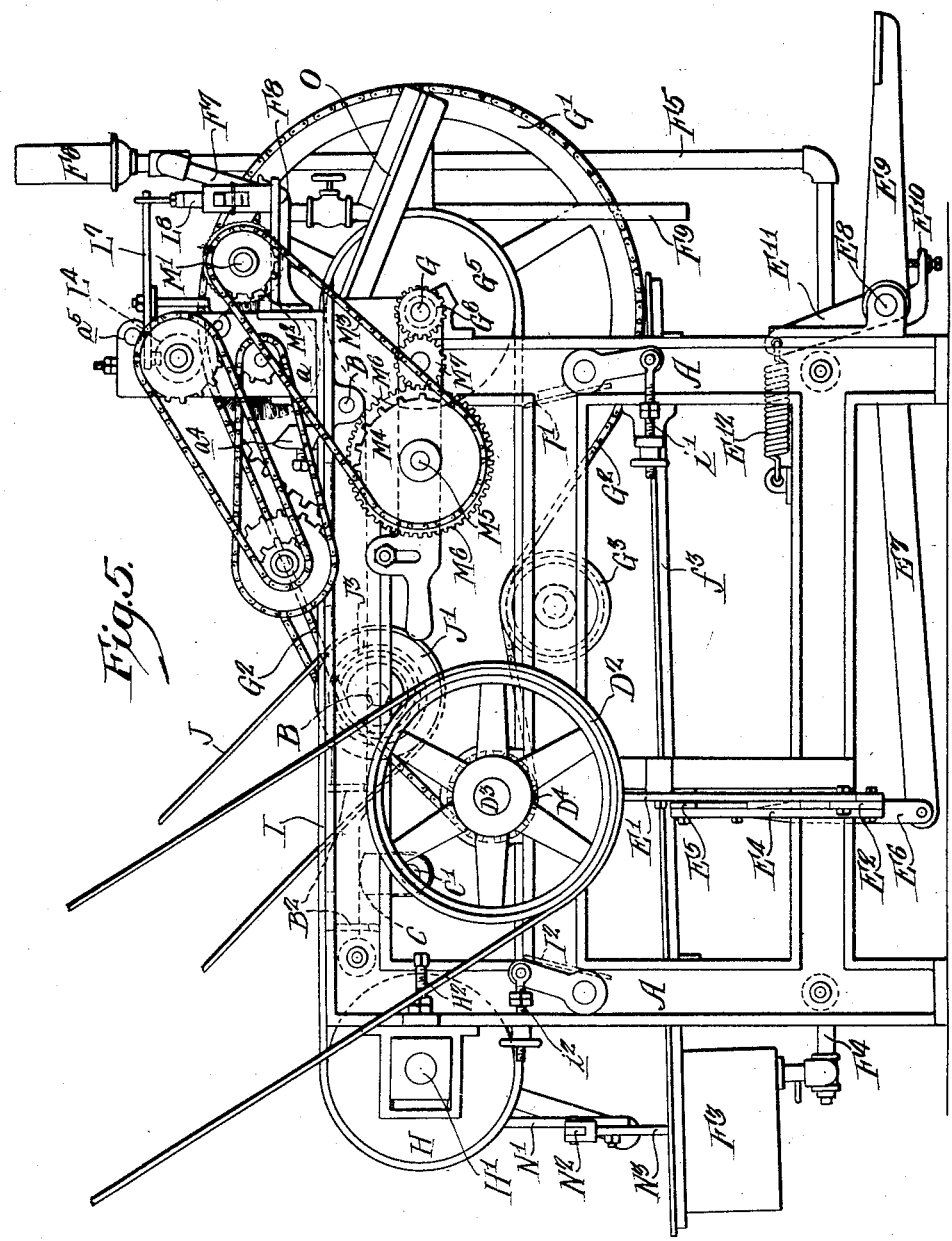
Inventor.
Harry B. Layton
by Francis D. Chambers
his Attorney.

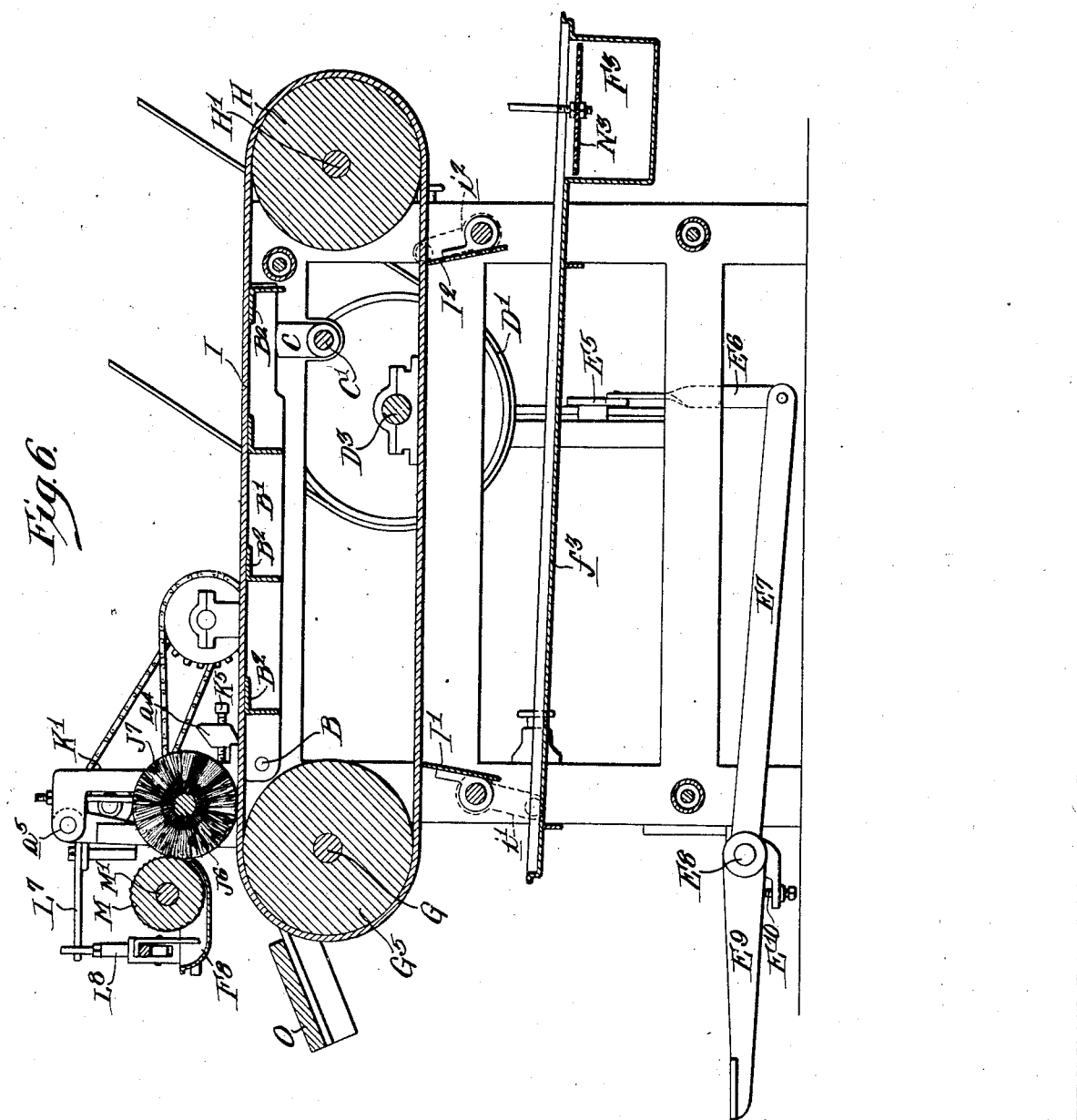

April 1, 1930. H. B. LAYTON 1,752,440
APPARATUS FOR SEASONING SKINS
Filed July 28, 1927 8 Sheets-Sheet 7
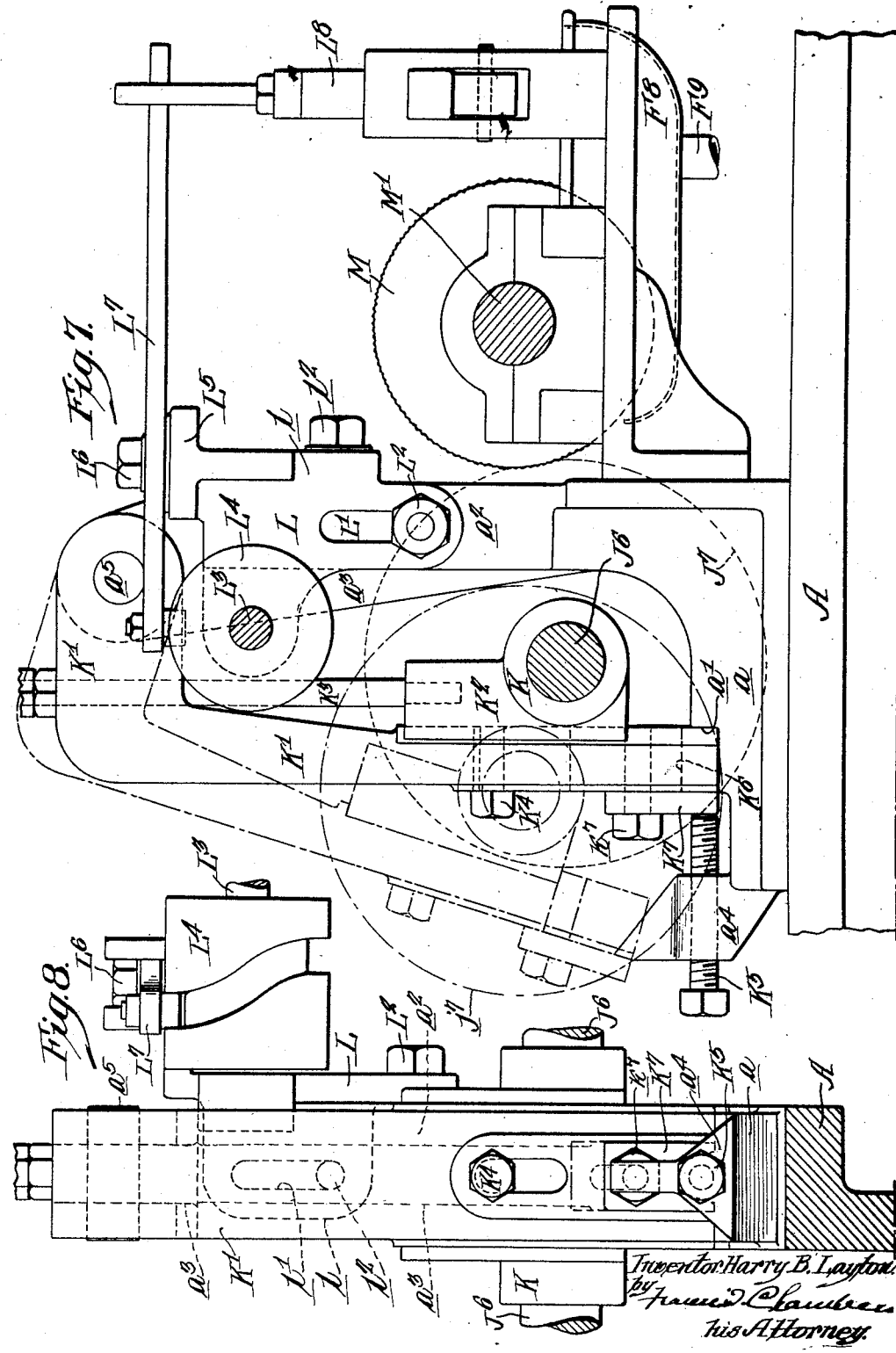

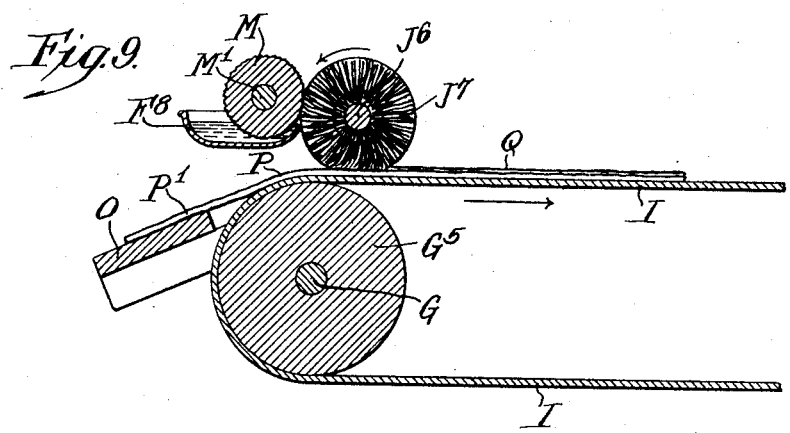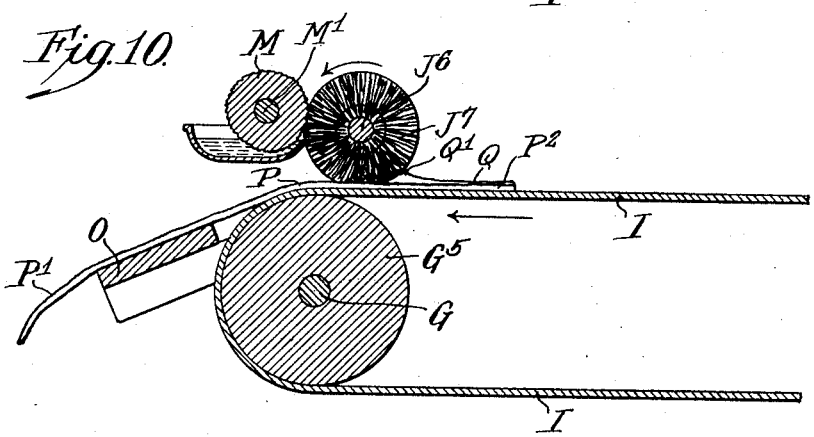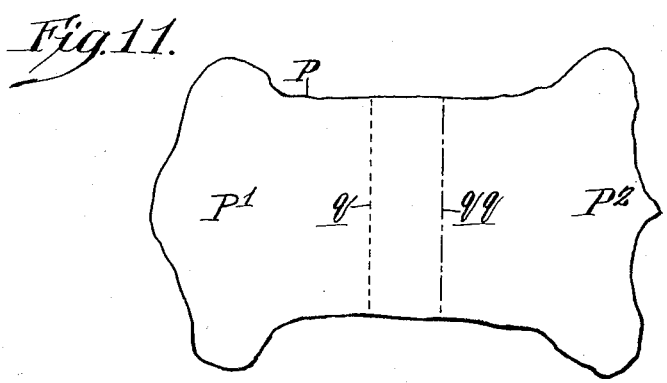

Patented Apr. 1, 1930

1,752,440

UNITED STATES PATENT OFFICE

HARRY B. LAYTON, OF WILMINGTON, DELAWARE, ASSIGNOR TO G. W. BAKER MACHINE COMPANY, OF WILMINGTON, DELAWARE, A CORPORATION OF DELAWARE.

APPARATUS FOR SEASONING SKINS

Application filed July 28, 1927. Serial No. 208,913.

My invention relates to machines for applying seasoning and the like to the surface of skins.

Seasoning machines have heretofore been used but have not been entirely satisfactory and for the skins requiring the finest finish it has heretofore been necessary to season them by a hand operation of skilled operators. Such machines have also been objectionable owing to their tendency to apply a certain amount of seasoning to the under side of the skins, this occurring at the edges of the skins. The object of my invention is to provide a machine by means of which a uniform seasoning can be applied to the surface of the skin which will be free from the tendency of previous machines to apply a certain amount of seasoning to the under edges of the skin. Broadly speaking, my machine is designed to apply to the face of the skin a layer of seasoning in excess of that which is intended to remain in contact with the skin and then removing the surplus seasoning, leaving on the skin only that amount of seasoning which is intended to be permanently applied.

The leading features of my new machine for applying the seasoning consists in providing a reversible bolster for transporting the skin beneath the brush which applies the seasoning and a single seasoning applying brush properly fed with seasoning which, by my method of operating the machine, is used to coat somewhat more than half of the skin with an excess of seasoning, then, on the reversal of the bolster, to sweep off from its surface any excess of seasoning and then, the skin being reversed, to similarly apply seasoning and remove the excess seasoning from the other end of the skin. Other features of my invention consist in provisions which I have made for removing the table or support which holds the bolster in position to a distance from the bolster when the machine is not in operation so as to prevent any seasoning which may be on the edges of the belt from adhering to the support and another feature of my construction consists in securing the seasoning applying brush to a retractable support so that when not in use it can be retracted from contact with the bolster.

My invention will be best understood as described in connection with the drawings in which Figure 1 is a side elevation of my machine.

Figure 2, a plan view of the machine.

Figure 3, an end elevation of the front of the machine.

Figure 4, an end elevation of the rear end of the machine.

Figure 5 is a side elevation of the machine taken from the opposite side of Fig. 1.

Figure 6 is a sectional elevation on the line 6—6 of Fig. 3.

Figures 7 and 8 are views on a larger scale of certain details of my machine.

Figures 9 and 10 are diagrammatic views illustrating the method in which the seasoning is applied to and removed from the skin, and Figure 11 is a view of a skin with the lap indicated where the two applications of seasoning lay, one above the other.

Figure 1:
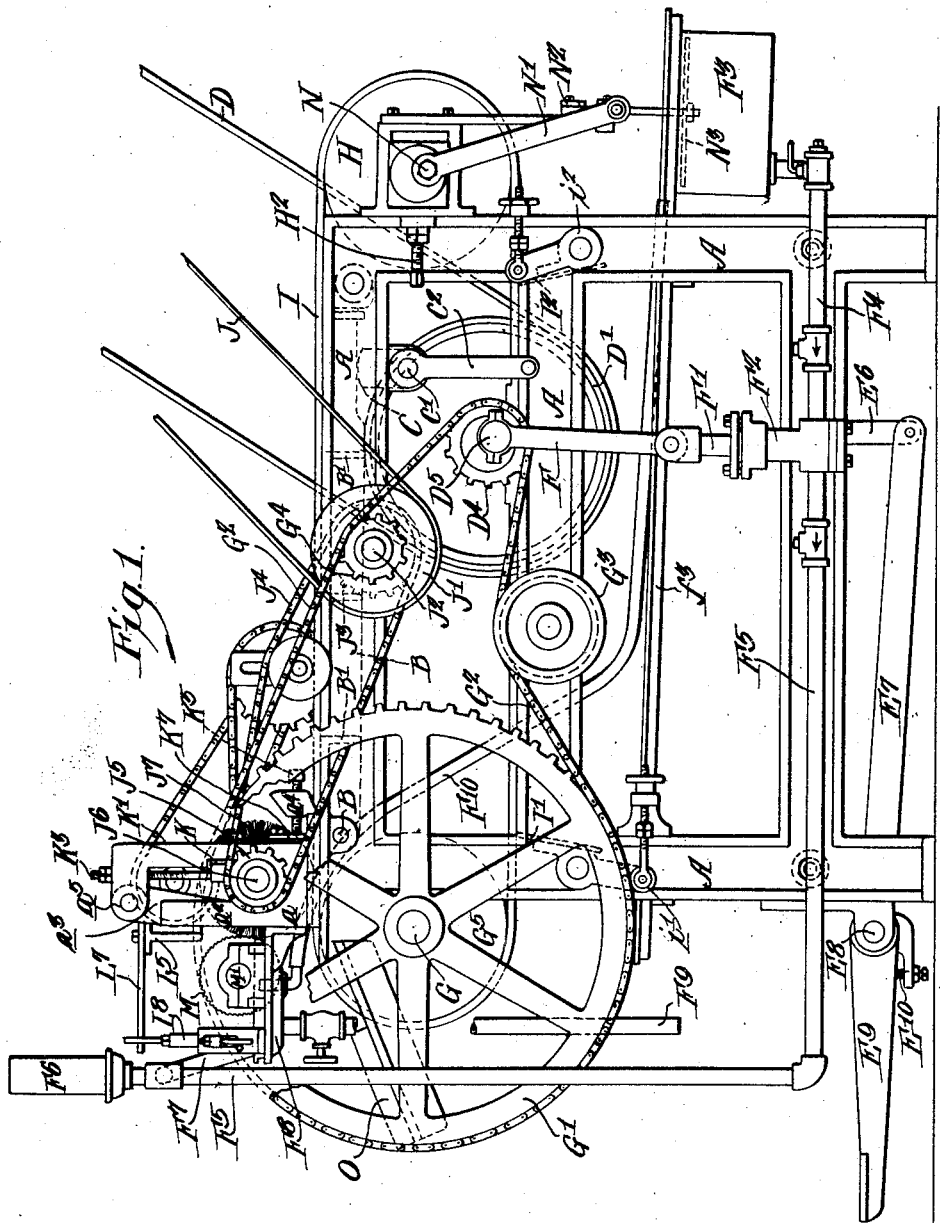

A indicates the framing of the machine. B is the table or support for the upper surface of the bolster which is pivotally supported at one end at B, its other end being supported on a cam C, secured to a shaft $C^1$, which is actuated by a lever $C^2$. The function of the cam is simply to hold the table in bolster supporting position when the machine is in operation and to permit it to be retracted by gravity when the machine is idle.

D indicate belts running in opposite directions, one connected with each of the pulleys $D^1$ and $D^2$, which turn freely on a shaft $D^3$ and are connected to actuate the shaft in one direction or the other by a clutch indicated at E, this clutch being actuated directly by lever $E^1$, pivoted at $e^1$, connected at its bottom with a toggle $E^2$, $E^3$, which in turn is actuated by a connecting rod $E^4$, attached to one end of the lever $E^5$, pivoted at $e^5$ and having its other end connected by a rod $E^6$ with a lever $E^7$ secured to a shaft $E^8$, which shaft is actuated by a foot treadle $E^9$, the throw of this foot treadle being adjusted by means of the device as indicated at $E^{10}$.

$D^4$ is a sprocket wheel secured to the shaft $D^3$, to the end of which shaft is also connected an eccentric pin indicated at $D^5$. This eccentric pin, through a connecting rod F, operates a piston rod $F^1$, the piston of which works in a cylinder $F^2$. The pump draws seasoning compound from a reservoir $F^3$, through a conduit $F^4$ and delivers it to a conduit $F^5$ and branch conduit $F^7$, into a pan indicated at $F^8$. $F^6$ is a chamber formed at the top of the conduit $F^5$, to prevent surging of the liquid delivered to the pan.

The sprocket $D^4$ is engaged by a sprocket chain $G^2$ which, as shown, is guided over idlers indicated at $G^3$ and $G^4$ and engaged with the large sprocket wheel indicated at $G^1$, which is secured to the shaft G, to which shaft is secured the bolster supporting an actuating drum $G^5$. $G^6$ indicates a gear wheel secured on the end of the shaft G. H is a drum supporting the other end of the bolster and supported on the shaft $H^1$. The shaft $H^1$ is adjustable, as indicated in Fig. 5, by a convenient adjusting device, indicated at $H^2$, which is for the purpose of keeping the bolster taut. I is the bolster supported on drums $G^5$ and H. $I^1$ and $I^2$ are scrapers located on the lower side of the bolster near its ends and made adjustable by devices, as indicated at $i^1$ and $i^2$.

J is a belt for conveying power from a source not shown, operating a pulley $J^1$ secured to a shaft $J^2$, to which shaft is also secured a sprocket wheel $J^3$ which drives a sprocket chain $J^4$, engaged with a sprocket wheel $J^5$ on a shaft $J^6$, to which shaft is secured the seasoning applying brush, indicated at $J^7$. The shaft $J^6$ is supported in bearings K, see Figs. 7 and 8, which bearings are supported on an arm $K^1$, through an adjustable head $K^2$, which is adjusted by means of the screw indicated at $K^3$ and clamped in position by a bolt indicated at $K^4$. The arm $K^1$ is held in operative position by means of a screw $K^5$ which abuts against a finger $K^7$, pivotally supported on the arm by pivot pin $k^7$ and which, when swung to one side, permits the arm to be shifted to the position indicated in dotted lines in Fig. 7, the end of the screw passing through a recess in the end of the arm $K^1$, indicated at $K^6$. The arm $K^1$ is pivotally supported on a shaft $a^5$, located on an extension $a^3$ of an upright frame $a^2$, the base of which frame is indicated at $a$ and is formed with a shoulder $a^1$, against which the end of the arm $K^1$ abuts when in operative position. The supplemental frame also supports a bracket L, adjustable by means of a slot $L^1$ and clamped in position by a screw $L^2$. This bracket supports a shaft $L^3$ on which is secured a cam $L^4$. The bracket L is provided with an extension indicated at $l$, also slotted, and provided with a clamping screw $l^2$ which supports a portion $L^5$ to which is secured a pivot pin $L^6$, on which turns a lever $L^7$, engaged at one end with a cam $L^4$ and at its other end engaged with a stirring device $L^8$, the function of which is to keep the seasoning in the pan $F^8$ in a proper state of agitation.

M is a grooved feeding roller secured to a shaft $M^1$ and extending down into the seasoning pan $F^8$. This roller runs in contact with the brush $J^7$ and is rotated through a sprocket wheel $M^2$, secured on the end of the shaft $M^1$ by a sprocket chain $M^3$, which is also engaged with a sprocket $M^4$, secured to the shaft $M^5$. This shaft has secured to it a gear wheel $M^6$, which is engaged by the idler $M^7$, through which it is driven by the gear wheel $G^6$ on the shaft G.

The seasoning in the reservoir $F^3$ is kept in agitation by a stirrer $N^3$, actuated by a lever $N^2$, which is kept in motion by a connecting rod $N^1$, secured to the eccentric pin N on the shaft $H^1$.

O indicates the feed table over which the skins are fed to the bolster.

In Figs. 9, 10, and 11, P indicates the skin to be seasoned; $P^1$ and $P^2$ indicating its ends. Q indicates the layer of seasoning applied to the surface of the skin by the brush $J^7$, the seasoning applied being somewhat in excess of that intended to remain on the skin. $Q^1$ indicates the bead or wave of surplus seasoning which is pushed over the surface of the skin when the bolster is reversed. $q$, Fig. 11, indicates the end of the layer of seasoning applied to the skin in the first operation performed upon the skin. $qq$, indicates the end of the layer of seasoning applied to the skin in the second operation performed upon it.

In operation, the clutch E is normally engaged with a pulley $D^1$, which drives the bolster in a direction away from the feeding table O. The agitators are kept in constant operation to keep the seasoning well stirred up in the reservoir $F^3$ and the pan $F^8$. The brush $J^7$ is in constant rotation in the same direction as the movement of the top of the bolster when it is moving away from the feed table and the feed roller M is so actuated as to deliver to the brush $J^7$ a surplus of the seasoning compound. The skin P, to be seasoned, is then fed over the table O on to the bolster by which it is carried beneath the brush $J^7$ and the skin is carried forward until somewhat more than half its length has passed beneath the brush applying seasoning, for instance, referring to Fig. 11, over the end $P^2$ of the skin up to a point indicated at $q$. The operator then reverses the motion of the bolster through the treadle $E^9$ and described mechanism connected therewith, with the result that the partly coated skin is moved backward under the rotating brush $J^7$, which pushes the surplus seasoning off of the coated portion of the skin in a wave, as indicated at $Q^1$, this surplus seasoning passing finally over the end of the skin and being delivered on the surface of the bolster from which it is removed by the scrapers $I^1$ or $I^2$, falling into the pan $f^3$, which returns it to the reservoir $F^3$. When the backward movement of the bolster shifts the skin backward so that the brush $J^7$ no longer contacts with it, the operator removes the skin from the bolster or table, releases the pressure on the treadle, permitting the clutch to again engage the forward driving pulley and reverses the skin, introducing its end $P^1$ on to the bolster and beneath the brush $J^7$, the skin being carried forward and coated with seasoning up to a point $qq$, which laps the coating limit $q$ of the first treatment. Then, again, the operator by actuating the foot treadle, reverses the motion of the bolster and retracts the skin, the brush $J^7$ sweeping the surplus seasoning off of its end $P^1$. It will be understood, of course, that the operation of coating first one and then the other end of the skin must be carried on with reasonable rapidity, that is, the first applied coating must not be permitted to dry before the second coating is applied. With this precaution, my method of seasoning skins and of operating my machine is found to give a perfectly even and altogether desirable coating of seasoning to the skin, comparable with results hitherto only obtained by skilled operators working by hand.

When my machine is not in use, I depress the table $B^1$ by means of the cam C, so that it is no longer in contact with the upper ply of the bolster. This prevents adherence of the bolster to the table, which is likely to occur through the presence of seasoning on the bolster or table where such seasoning is permitted to dry with the parts in contact.

It is also desirable, when the machine is not in use, to remove the brush $J^7$ from contact with the bolster I and also from contact with the feed roll M. It is for this purpose that I provide the mechanism described in connection with Figs. 7 and 8, by means of which the brush $J^7$ can be swung away from contact with the bolster and feed rolls, that is, by a swinging motion toward the right, as shown in Fig. 6.

It will be obvious that the scrapers $I^1$ and $I^2$, located near the ends of the under ply of the bolster, will promptly remove any seasoning from the surface of the bolster so that the bolster is kept practically free from seasoning on its upper face.

In machines which have heretofore been used for applying the seasoning to skins, a number of brushes acting successively on the skin have been used to apply the seasoning and to brush it into the texture of the leather. This has not been successful in giving a perfect surface to the leather and it has also been found objectionable because in machines of this kind in which the skins are fed continuously forward, defects have been found, owing to the tendency of the brushes to come in contact with the under side of the skin and apply seasoning where it is not wanted. By my method of operating my machine, this defect is entirely avoided. I use but a single brush which performs the double function of applying the seasoning and, on a reversal of the bolster, sweeping off certain seasoning and it is then without any tendency to lift the end of the skin so that the seasoning can get on to its under side.

Having now described my invention, what I claim as new and desire to secure by Letters Patent, is:

1. A seasoning machine having in combination an endless bolster adapted to support and transport a hide during the seasoning operation, drums over which the bolster extends, reversible means for driving one of the drums in opposite directions, a brush for applying seasoning compounds located above and near the feed end of the bolster, means for rotating said brush in the direction in which skins are fed to the machine and means for feeding seasoning to the brush.

2. A seasoning machine having in combination an endless bolster adapted to support and transport a hide during the seasoning operation, drums over which the bolster extends, reversible means for driving one of the drums in opposite directions, a brush for applying seasoning compounds located above and near the feed end of the bolster, said machine having no other brush contacting with the bolster, means for rotating said brush in the direction in which skins are fed to the machine and means for feeding seasoning to the brush.

HARRY B. LAYTON.